(12) United States Patent
Kobayashi

(10) Patent No.: US 7,408,853 B2
(45) Date of Patent: Aug. 5, 2008

(54) REPRODUCTION-ONLY RECORDING MEDIUM, REPRODUCING APPARATUS, REPRODUCING METHOD, AND DISK MANUFACTURING METHOD

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 665 days.

(21) Appl. No.: 10/733,894

(22) Filed: Dec. 10, 2003

(65) Prior Publication Data
US 2004/0165504 A1 Aug. 26, 2004

(30) Foreign Application Priority Data
Dec. 13, 2002 (JP) ............... 2002-361647

(51) Int. Cl.
*G11B 5/09* (2006.01)
(52) U.S. Cl. ............... 369/47.27; 369/47.19; 369/59.25
(58) Field of Classification Search ............... None
See application file for complete search history.

(56) References Cited

U.S. PATENT DOCUMENTS 5,901,127 A * 5/1999 Sako et al. ............... 369/59.24
6,256,276 B1 * 7/2001 Kobayashi et al. ....... 369/47.31
6,628,584 B1 * 9/2003 Heemskerk et al. ........ 369/47.1
6,912,191 B2 * 6/2005 Suzuki .................... 369/59.25

FOREIGN PATENT DOCUMENTS

| EP | 1 146 513 A2 | 10/2001 |
|---|---|---|
| JP | 2006-274885 | 9/1994 |
| JP | 2008-055343 | 2/1996 |
| JP | 2000-082219 | 3/2000 |
| WO | WO 01/29832 A1 | 4/2001 |

* cited by examiner

*Primary Examiner*—Joseph Feild
*Assistant Examiner*—Tawfk Goma
(74) *Attorney, Agent, or Firm*—Oblon, Spivak, McClelland, Maier & Neustadt, P.C.

(57) ABSTRACT

A ROM disk having a block data format provided with linking areas as with a rewritable disk. Main data recorded in a main data area and linking data recorded in a linking area in each block are scrambled by identical scrambling data. The scrambling data is generated by a random sequence using address information of the block as an initial value.

7 Claims, 13 Drawing Sheets

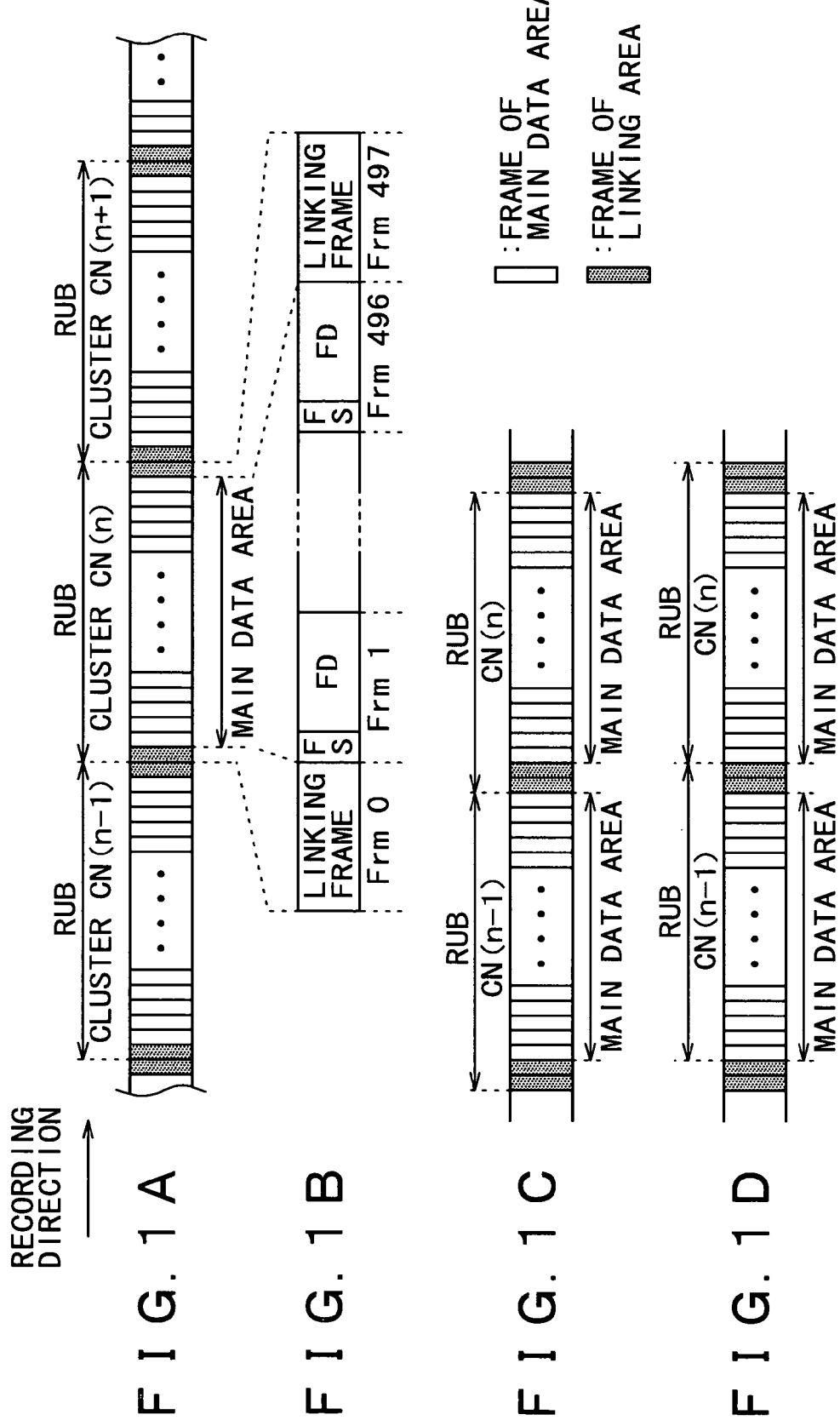

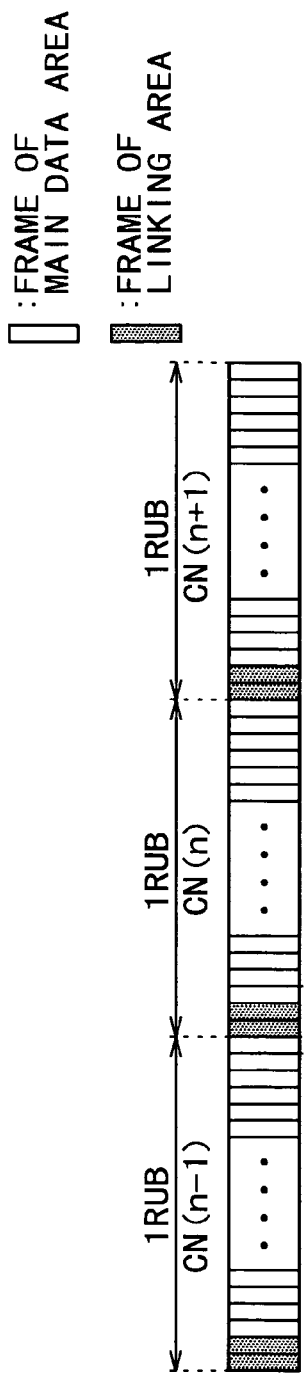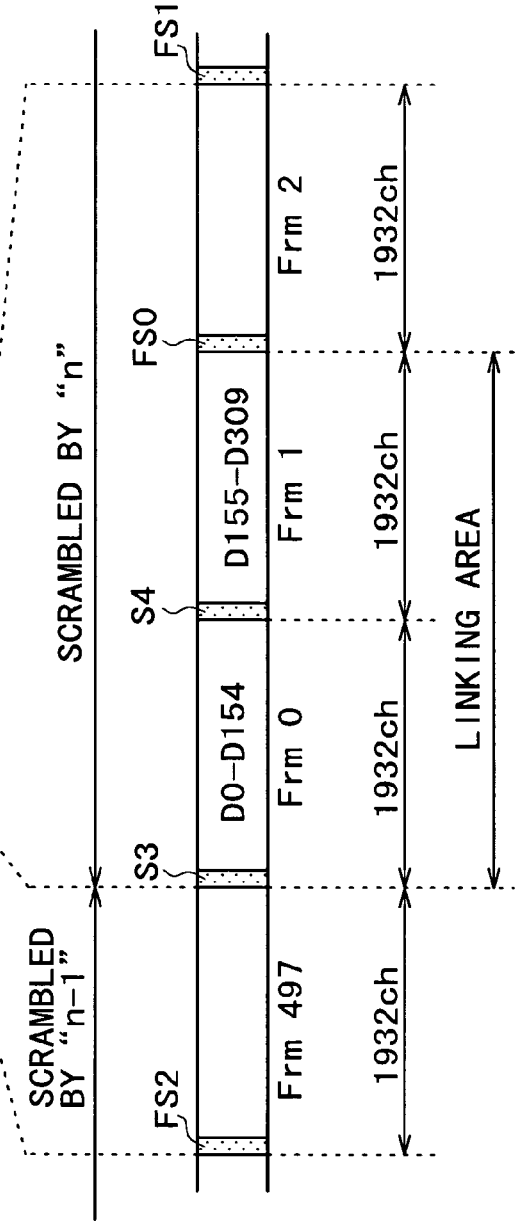
F I G. 5 A
F I G. 5 B

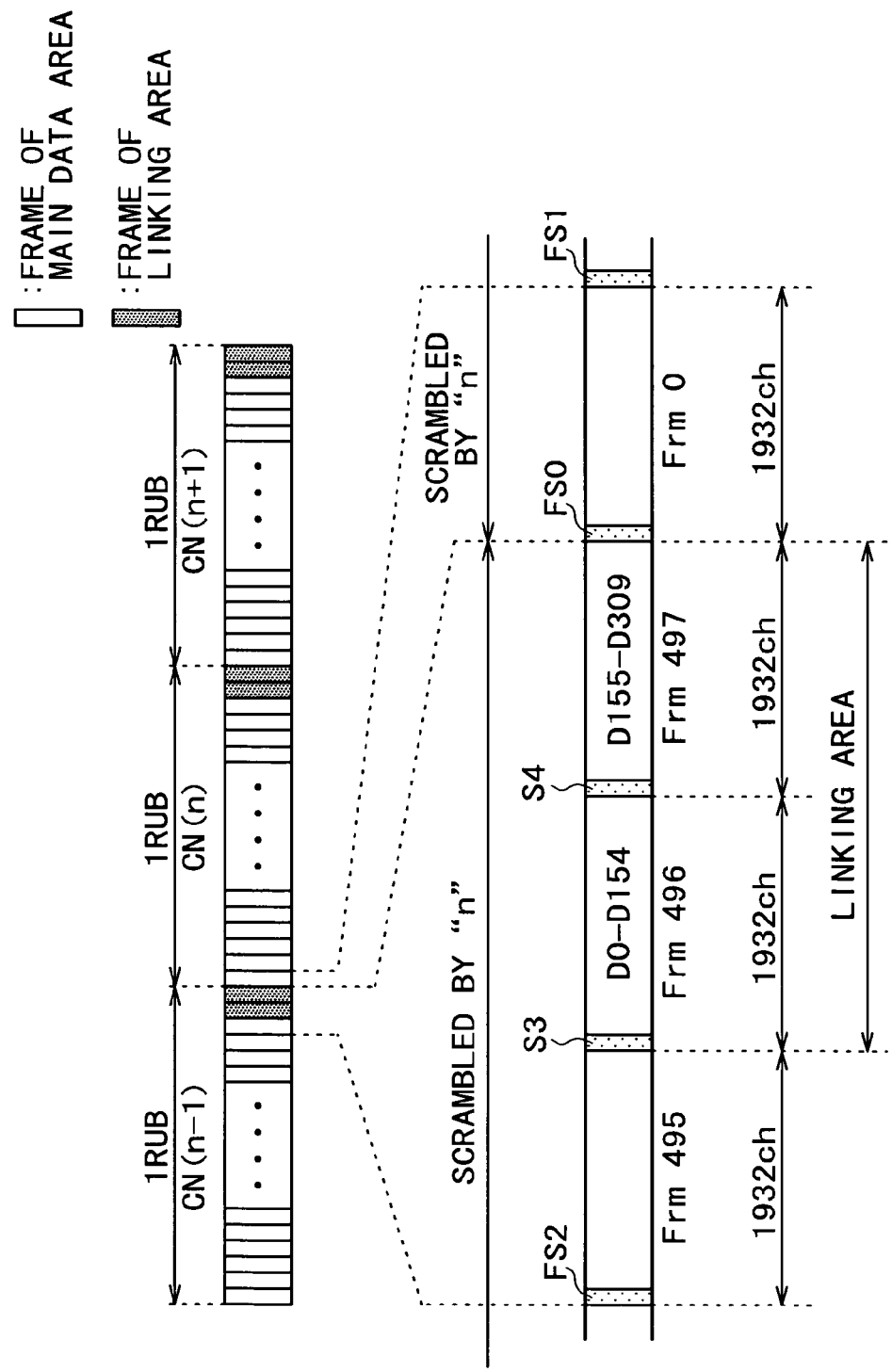

F I G. 7A
LDC
RS (248, 216, 33)
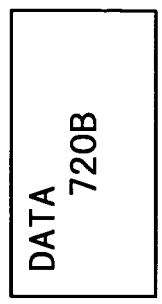
F I G. 7B
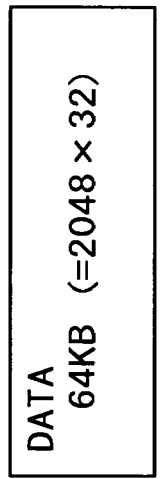
F I G. 7C
BIS
RS (62, 30, 33)
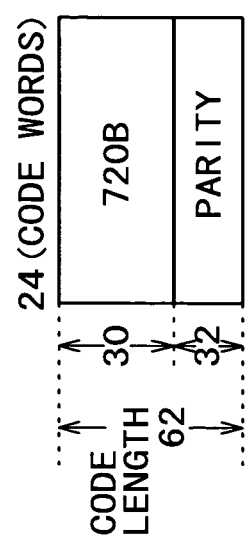
F I G. 7D
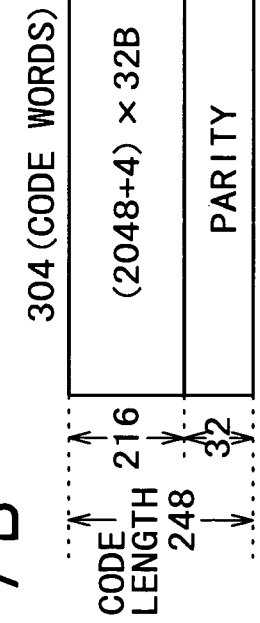

F I G. 1 0
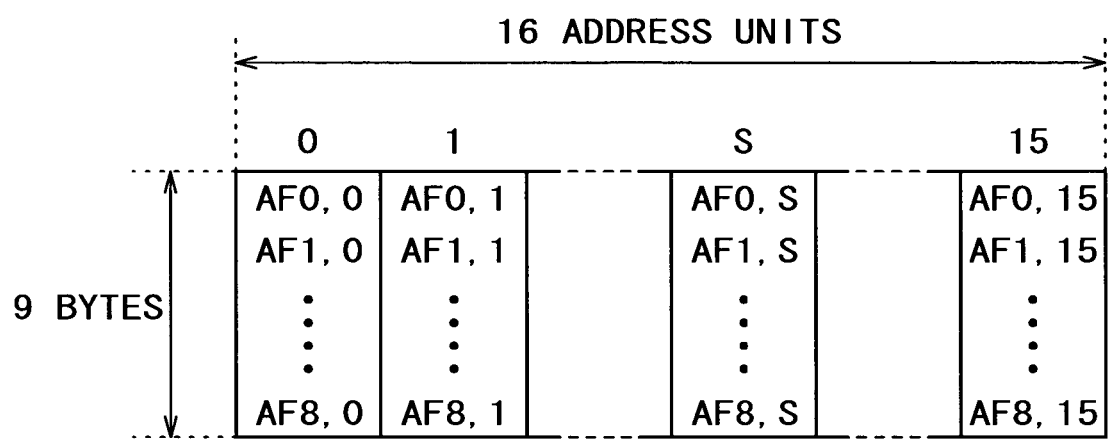

FIG. 11A

| SYNC NUMBER | 24-BIT SYNC BODY<br>⌐9T⌐9T⌐ | | 6-BIT SYNC ID |
|---|---|---|---|
| FS0 | #01 010 000 000 010 000 000 010 | | 000 001 |
| FS1 | #01 010 000 000 010 000 000 010 | | 010 010 |
| FS2 | #01 010 000 000 010 000 000 010 | | 101 000 |
| FS3 | #01 010 000 000 010 000 000 010 | | 100 001 |
| FS4 | #01 010 000 000 010 000 000 010 | | 000 100 |
| FS5 | #01 010 000 000 010 000 000 010 | | 001 001 |
| FS6 | #01 010 000 000 010 000 000 010 | | 010 000 |
| FS7 | #01 010 000 000 010 000 000 010 | | 100 101 |

FIG. 11B

| FRAME NUMBER | FRAME SYNC | FRAME NUMBER | FRAME SYNC |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

| LINKING S3 | FS7 |
|---|---|
| LINKING S4 | FS2 |

REPRODUCTION-ONLY RECORDING MEDIUM, REPRODUCING APPARATUS, REPRODUCING METHOD, AND DISK MANUFACTURING METHOD

BACKGROUND OF THE INVENTION

The present invention relates to a recording medium such as an optical disk or the like, and particularly to a data format of a reproduction-only recording medium, and also relates to a reproducing apparatus and a reproducing method for the reproduction-only recording medium, and a disk manufacturing method.

As technology for recording and reproducing digital data, there is data recording technology using optical disks (including magneto-optical disks) such for example as CDs (Compact Disks), MDs (Mini-Disks), and DVDs (Digital Versatile Disks) as recording media. The optical disk is a generic name for recording media that allow a signal to be read by irradiating a disk formed by a metallic thin plate protected with plastic with laser light and detecting change in the reflected light.

Optical disks include for example reproduction-only types known as CD, CD-ROM, DVD-ROM and the like and user data recordable types known as MD, CD-R, CD-RW, DVD-R, DVD-RW, DVD+RW, DVD-RAM and the like. The recordable types allow data to be recorded thereon by using a magneto-optical recording method, a phase change recording method, a dye film change recording method and the like. The dye film change recording method is also referred to as a write-once recording method, which allows data recording only once and does not allow rewriting. The dye film change recording method is therefore suitable for data storing purposes and the like. On the other hand, the magneto-optical recording method and the phase change recording method allow data rewriting, and are used for various purposes including recording of various contents data such as music, video, games, application programs and the like.

In addition, high-density optical disks referred to as DVR (Data & Video Recording) or Blu-ray disks have recently been developed to increase the capacity significantly.

In a disk structure of such a high-density disk as DVR with a 0.1 mm cover layer in a direction of thickness of the disk, phase change marks are recorded and reproduced under conditions of a combination of a laser (so-called blue laser) having a wavelength of 405 nm and an objective lens having an NA of 0.85. Supposing that a track pitch is 0.32 $\mu$m and a linear density is 0.12 $\mu$ m/bit with a data block of 64 KB (kilobytes) as one recording and reproducing unit, and supposing that format efficiency is about 82%, a volume of about 23.3 GB (gigabytes) can be recorded and reproduced on a disk 12 cm in diameter.

Supposing that the linear density is 0.112 $\mu$m/bit in the same format, a volume of about 25 GB can be recorded and reproduced.

Further, a multilayer structure of a recording layer can dramatically increase the capacity. For example, by making the recording layer of two layers, the capacity can be double the above capacity, that is, 46.6 GB or 50 GB.

On a reproduction-only disk, for example a DVD-ROM of the above-mentioned various optical disks, data is recorded as pits created in advance (embossed pits or the like) basically in units of error correcting blocks.

In a conventionally known data format of the reproduction-only disk, units of error correcting blocks are recorded continuously without a break. This means that an error correcting block is a block of one recording and reproducing unit, and that no linking area (buffer area) is formed between blocks.

As with the reproduction-only disk, data is recorded and reproduced on recordable disks (recording and reproducing disks) basically in units of error correcting blocks.

However, a linking area may be formed between blocks in consideration of random access recording characteristics.

Using linking has an advantage in that when a recording and reproducing apparatus realizes block random access, the block random access can be realized by simpler and less expensive hardware than in a data format without linking.

Disk format techniques with linking are disclosed in the following literature, for example.

[First Patent Literature]
U.S. Pat. No. 5,528,569
[Second Patent Literature]
U.S. Pat. No. 5,552,896

Consideration will now be given to a reproduction-only disk and a recording and reproducing disk as fundamentally the same type of disk. For example, the reproduction-only disk is a DVD-ROM and the recording and reproducing disk is a DVD-RAM or the like. Alternatively, the reproduction-only disk and the recording and reproducing disk are the above-mentioned high-density disk (DVR).

Reproduction compatibility between disks of the same type is required. The compatibility is decreased when a data arrangement system (data format) differs between the reproduction-only disk without linking and the recording and reproducing disk with linking, for example.

Specifically, a reproducing apparatus supporting both disks in such a case needs to have two similar pieces of hardware or software as reproduction timing generating circuits, synchronizing circuits, firmware and the like for the reproduction-only disk and the recording and reproducing disk, and switch between the two similar pieces of hardware or software according to a disk to be reproduced. That is, burdens on configuration of the apparatus are increased to maintain the compatibility.

Accordingly, there is a proposition that the format of the above-mentioned high-density disk have linking areas also on the reproduction-only disk, for example.

However, when linking is provided for the reproduction-only disk where data is recorded by embossed pits as the above-mentioned high-density disk, for example, the following problems occur.

A rewritable disk as the high-density disk has a groove formed thereon in a spiral shape, and has phase change marks recorded and reproduced along the groove.

For a tracking servo to apply laser light along the groove, a tracking error signal formed by a push-pull signal is used.

Consideration will be given to a reproduction-only disk (hereinafter referred to as a ROM disk) having embossed pits formed with the same density and the same data format as those of the rewritable disk.

The rewritable disk has a shallow groove of about $\lambda/10$ ($\lambda$=laser wavelength) formed thereon to reduce media noise.

On the other hand, for a high level of a reproduced RF signal, it is desirable to form pits about $\lambda/4$ deep on the ROM disk.

However, from a viewpoint of the tracking servo, it is desirable to form pits about $\lambda/8$ deep for a high level of the push-pull signal.

It is therefore difficult to determine conditions for forming the ROM disk when the tracking servo using the push-pull signal is a precondition.

In addition to the method using the push-pull signal, a DPD (Differential Phase Detection) method is known as a tracking error signal detection method. A DPD signal becomes high in level by pits of a depth of λ/4, which is the same condition as for the reproduced RF signal. The DPD signal is therefore desirable for the ROM disk. Thus, using the DPD signal as a tracking error signal for the ROM disk has been considered.

However, the DPD signal does not have a sufficient signal level when pit patterns of adjacent tracks are the same.

In this case, linking areas on the ROM disk which areas are set in consideration of compatibility with the rewritable disk as described above become a problem.

Linking areas at front ends and rear ends of blocks on the rewritable disk where recording and reproduction are performed in block units are intended for PLL synchronization and protection of recorded data. The linking areas use for example a fixed preamble pattern for PLL processing or the like.

In the case of the ROM disk provided with linking areas in consideration of such a compatibility with the rewritable disk, when linking areas are aligned with each other on adjacent tracks, pit patterns of the adjacent tracks in that part are the same. Therefore, a sufficient level of a DPD signal is not obtained at such a part, which may affect the tracking servo.

SUMMARY OF THE INVENTION

In view of such problems, it is an object of the present invention to realize a reproduction-only recording medium that has a data format excellent in compatibility with a rewritable disk and is also advantageous from a viewpoint of a tracking servo.

In order to achieve this object, there is provided a reproduction-only recording medium wherein blocks having a main data area and a linking area are continuous with each other to form a data track with embossed pits; and main data recorded in the main data area and linking data recorded in the linking area in each of the blocks are scrambled by scrambling data generated by an identical system.

In this case, the scrambling data is generated by a random sequence using address information of the block as an initial value.

In each of the blocks, the linking area is formed on a front end side and a rear end side of the main data area.

Alternatively, in each of the blocks, the linking area is formed on only a front end side of the main data area.

Alternatively, in each of the blocks, the linking area is formed on only a rear end side of the main data area.

According to the present invention, there is provided a reproducing apparatus for performing data reproduction in correspondence with at least a reproduction-only recording medium in which medium blocks having a main data area and a linking area are continuous with each other to form a data track with embossed pits, and main data recorded in the main data area and linking data recorded in the linking area in each of the blocks are scrambled by scrambling data generated by an identical system. The reproducing apparatus comprises: reading means for reading information from a recording medium loaded into the reproducing apparatus; and decoding means for subjecting the information read by the reading means to data decoding processing and descrambling processing, and reproducing the main data and the linking data.

Further, the decoding means subjects the information read by the reading means to the descrambling processing using scrambling data generated by a random sequence using address information of the block as an initial value.

According to the present invention, there is provided a reproducing method for reproducing data from a reproduction-only recording medium, in which medium blocks having a main data area and a linking area are continuous with each other to form a data track with embossed pits, and main data recorded in the main data area and linking data recorded in the linking area in each of the blocks are scrambled by scrambling data generated by a random sequence using address information of the block as an initial value, the reproducing method including the steps of: reading information from a loaded recording medium; and subjecting the read information to data decoding processing and descrambling processing using scrambling data generated by a random sequence using the address information of the block as an initial value, and reproducing the main data and the linking data.

According to the present invention, there is provided a disk manufacturing method for manufacturing a reproduction-only disk recording medium, in which medium blocks having a main data area and a linking area are continuous with each other as a data track formed with embossed pits, the disk manufacturing method including: scrambling main data recorded in the main data area and linking data recorded in the linking area by using scrambling data generated by a random sequence using address information of the block as an initial value; and performing disk mastering using the scrambled data.

The reproduction-only recording medium according to the present invention as described above has a data format in which blocks having a main data area and a linking area are continuous with each other. Therefore the reproduction-only recording medium is suitable for compatibility with a rewritable disk. Further, since scrambling processing is performed also in the linking area, even when linking areas are aligned with each other in adjacent tracks, for example, alignment of the same pit patterns does not occur.

BRIEF DESCRIPTION OF THE DRAWINGS

FIGS. 1A, 1B, 1C, and 1D are diagrams of assistance in explaining RUB structures of a ROM disk and a rewritable disk according to an embodiment of the present invention;

FIGS. 5A and 5B are diagrams of assistance in explaining a second data format example of the ROM disk according to the embodiment;

FIGS. 6A and 6B are diagrams of assistance in explaining a third data format example of the ROM disk according to the embodiment;

FIGS. 7A, 7B, 7C, and 7D are diagrams of assistance in explaining an ECC block of the ROM disk according to the embodiment;

FIG. 10 is a diagram of assistance in explaining a structure of the address units of the ROM disk according to the embodiment;

FIGS. 11A and 11B are diagrams of assistance in explaining frame sync patterns and frame sync order of the ROM disk according to the embodiment;

DETAILED DESCRIPTION OF PREFERRED EMBODIMENTS

Figure 2:
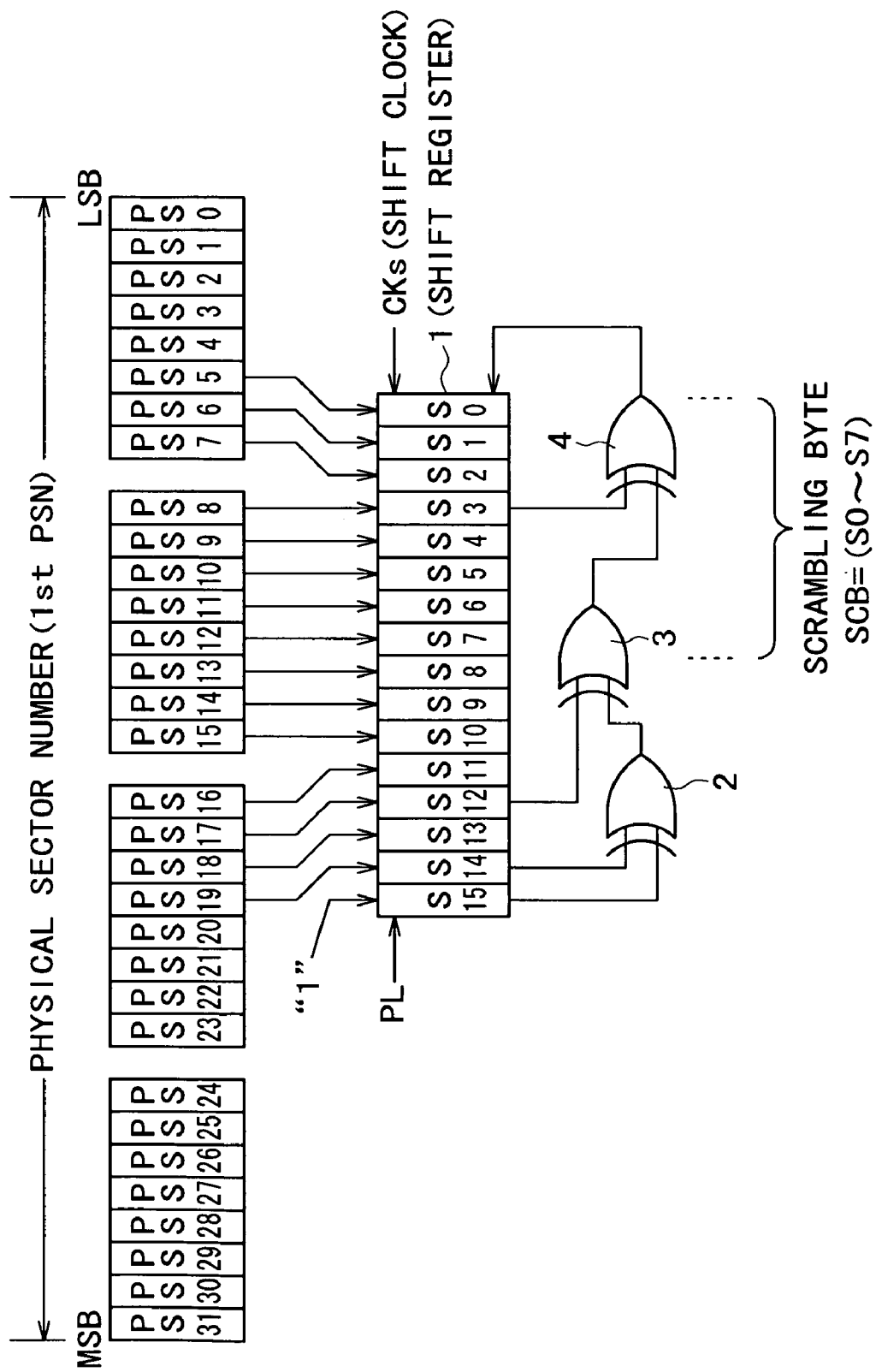
FIG. 2 is a diagram of assistance in explaining a scrambling system according to the embodiment.

Description will hereinafter be made of a reproduction-only optical disk as an embodiment of a reproduction-only recording medium according to the present invention. Description will also be made of a reproducing apparatus capable of reproducing the reproduction-only optical disk and a recording and reproducing optical disk capable of recording data, and a mastering apparatus for manufacturing the reproduction-only optical disk.

Incidentally, the reproduction-only optical disk according to the embodiment will be referred to as a "ROM disk," and the recording and reproducing optical disk will be referred to as a "rewritable disk." The description will be made in the following order.

1. RUB Structure, 2. Scrambling System, 3. Data Format of Rewritable Disk, 4. First Example of Data Format of ROM Disk, 5. Second Example of Data Format of ROM Disk, 6. Third Example of Data Format of ROM Disk, 7. ECC Block and Address, 8. Sync Patterns and Order, 9. Disk Drive Apparatus, and 10. Disk Manufacturing Method.

1. RUB Structure

The ROM disk according to the present embodiment has as one object a data format suitable for compatibility with the rewritable disk in the same category.

Description will first be made of structure of an RUB (Recording Unit Block), which is a recording and reproducing block on the ROM disk and the rewritable disk.

Suppose that the ROM disk and the rewritable disk according to the present embodiment belong to the category of high-density disks described above as DVR disks (Blu-ray disks).

The rewritable disk is an optical disk 12 cm in diameter, having a disk structure with a 0.1 mm cover layer in a direction of thickness of the disk. Phase change marks are recorded and reproduced under conditions of a combination of a laser (so-called blue laser) having a wavelength of 405 nm and an objective lens having an NA of 0.85. The recording and reproduction is performed at a track pitch of 0.32 μm and a linear density of 0.12 μm/bit with a data block of 64 KB (kilobytes) as one recording and reproducing unit (RUB).

The ROM disk is a similar disk 12 cm in diameter, and has reproduction-only data recorded thereon by embossed pits about λ/4 in depth. Recording and reproduction of the ROM disk is similarly performed at a track pitch of 0.32 μm and a linear density of 0.12 μm/bit with a data block of 64 KB (kilobytes) as one recording and reproducing unit (RUB).

In reproduction of the ROM disk, a DPD signal is used as a servo error signal in a tracking servo.

An RUB, which is a recording and reproducing unit of the ROM disk and the rewritable disk as high-density disks, has a total of 498 frames formed by adding to an ECC block (cluster) of 156 symbols×496 frames a link area of one frame for PLL synchronization or the like in front of and in the rear of the ECC block, for example.

The rewritable disk has a wobbling groove formed thereon, and the wobbling groove is a recording and reproducing track. The wobbling of the groove includes so-called ADIP data. That is, an address on the disk can be obtained by detecting wobbling information of the groove.

The rewritable disk has recording marks formed by phase change marks recorded on the track formed by the wobbling groove. The phase change marks are recorded at a linear density of 0.12 μm/bit or 0.08 μm/ch bit by an RLL (1, 7) PP modulation method (RLL; Run Length Limited, PP: Parity preserve/Prohibit rmtr (repeated minimum transition runlength)) or the like.

Letting 1 T be 1 ch bit, length of a mark is 2 T to 8 T, and the shortest mark length is 2 T.

The ROM disk does not have the groove formed thereon, but has data modulated similarly by the RLL (1, 7) PP modulation method recorded thereon as an embossed pit train.

FIGS. 1A, 1B, 1C, and 1D show structures of RUBs as units (recording and reproducing units) of reproducing channel data.

As shown in FIG. 1A, RUBs are recorded in order as a continuous sequence from a data recording start position on the disk at predetermined positions specified by addresses on the disk.

In this case, RUBs at cluster addresses CN(n−1), CN(n), and CN(n+1) are shown.

A cluster is a unit of 64 KB, and corresponds to a main data area of the RUB. A unit obtained by adding a linking area to the cluster of 64 KB is referred to herein as the RUB.

Therefore a cluster address can also be said to be an address of an RUB unit.

As shown in FIG. 1B, an RUB comprises 498 frames Frm0 to Frm497.

In FIG. 1A, each RUB is shown divided into frame units. Hatched frames form linking areas, whereas unhatched frames form main data areas.

As shown in FIGS. 1A and 1B, in the case of the rewritable disk, a start frame Frm0 and an end frame Frm497 of each RUB are frames as a linking area, and frames Frm1 to Frm496 are frames as a main data area.

Each of 496 frames (Frm1 to Frm496 in the case of FIGS. 1A and 1B) forming a main data area has a frame sync FS disposed at a start of the frame, and has frame data FD disposed so as to succeed the frame sync FS. The frame sync FS is 30 channel bits. Main data (user data) is recorded as the frame data FD.

Each frame is 1932 channel bits including the frame sync FS of 30 channel bits.

Incidentally, a frame (Frm0 or Frm497 in the case of FIGS. 1A and 1B) forming a linking area is also 1932 channel bits. A structure within the frame will be described later.

Three examples of the RUB structure of the ROM disk according to the present embodiment, that is, a first, a second, and a third ROM format example will be described later. The first ROM format example is shown in FIGS. 1A and 1B.

Specifically, in the example, frames forming a linking area are added with one frame on each of a front end side and a rear end side of a main data area.

As shown in FIG. 1C, in the second ROM format example, first two frames of an RUB form a linking area. That is, in this case, frames Frm0 and Frm1 form a linking area, and frames Frm2 to Frm497 form a main data area.

As shown in FIG. 1D, in the third ROM format example, two frames at an end of an RUB form a linking area. That is, in this case, frames Frm496 and Frm497 form a linking area, and frames Frm0 to Frm495 form a main data area.

Incidentally, in the following description, frames forming a linking area will also be referred to as "linking frames," and frames forming a main data area will also be referred to as "data frames."

2. Scrambling System

A scrambling system used in the present embodiment will next be described.

Scrambling processing to be described below is performed on not only frame data FD (main data: user data) recorded in frames as a main data area as described above but also data in frames as a linking area on the ROM disk according to the present embodiment.

FIG. 2 schematically shows a scrambling circuit. Thirty-two bits PS0 to PS31 represent a physical sector number.

The physical sector number is a physical address for a sector of 2-KB data, and is 4 bytes (32 bits). When recording and reproduction is performed in units of one cluster of 64 KB forming one RUB, 32 physical sector numbers are assigned to one cluster.

Fifteen bits PS5 to PS19 of the 32-bit physical sector number represent a cluster number (a cluster address CN of an RUB unit).

The scrambling circuit comprises a 16-bit shift register 1 based on a polynomial $\phi(x)=X16+X15+X13+X4+1$, and exclusive-OR circuits (EX-OR circuits) 2, 3, and 4.

S0 to S15 denotes data retained in the shift register 1.

The shift register 1 shifts a value of data Sn to S(n+1) for each clock of a shift clock CKs (n=0 to 14).

However, a value obtained via the EX-OR circuits 2, 3, and 4 is inputted as data S0. That is, supposing that "$" denotes exclusive-or logic, (S15) $ (S14) $ (S12) $ (S3) is inputted as data 50.

In the scrambling method, at a start of a data block (RUB) to be scrambled, the data S0 to S15 is loaded into the shift register 1 on the basis of a parallel load signal PL.

In this case, the values of PS5 to PS19 in the physical sector number are loaded as the data S0 to S14. Incidentally, the thus preset physical sector number is a first physical sector number in the cluster.

A fixed value "1" is loaded as the data S15.

The cluster number in the physical sector number is thus preset as initial values as the data S0 to S15 in the shift register 1. The first data S0 to S7 at this time becomes a first scrambling byte SCB.

Then, data S0 to S7 after an 8-bit shift becomes a next scrambling byte SCB.

As shown in FIGS. 1A to 1D, there are two frames forming a linking area in one RUB.

Data in one frame excluding the frame sync is 155 bytes, and a two-frame section is 310 bytes.

Suppose that the data of 310 bytes recorded in a linking area is data D0 to D309. In this case, the scrambling circuit repeats an 8-bit shift 309 times. That is, the data S0 to S7 at the time of loading and data S0 to S7 at the time of each of the 309 8-bit shifts after the loading form scrambling bytes (SCB0 to SCB309) for the data D0 to D309.

Then, the data D0 to D309 in the linking area is scrambled by the scrambling bytes (SCB0 to SCB309).

Specifically, supposing that original data (data before being scrambled) of the data D0 to D309 recorded in the linking area is LD0 to LD309, the data D0 to D309 is scrambled as $D(k)=(LD(k))\$(SCB(k))$ where $ denotes exclusive-or logic, and "k" is a value of 0 to 309.

In practice, supposing that the original data LD0 to LD309 to be recorded in the linking area is all zero data, the 310 scrambling bytes (SCB0 to SCB309) obtained as described above are set as they are as the data D0 to D309 in the linking area by the above-described scrambling processing.

When the original data LD0 to LD309 to be recorded in the linking area is significant data, for example data used for control or management, the data LD0 to LD309 is scrambled by the respective scrambling bytes (SCB0 to SCB309) to become the data D0 to D309 of the linking area.

Incidentally, while in this case, the scrambling bytes SCB0 to SCB309 are obtained by the 309 8-bit shifts after initial value presetting, presetting may be performed for frame units (units of 155 bytes) (154 8-bit shifts) to obtain scrambling bytes (SCB0 to SCB154) in correspondence with data of each of the two linking frames.

In this case, "k" in the above expression $D(k)=(LD(k))\$(SCB(k))$ is a value of 0 to 154.

Supposing that the original data LD0 to LD309 to be recorded in the linking area is all zero data, each of the data D0 to D154 and the data D155 to D309 is, in the result, values of the scrambling bytes (SCB0 to SCB154).

On the other hand, the scrambling circuit repeats the 8-bit shift 2051 times for a 2-KB unit in a main data area of a cluster of 64 KB. A scrambling byte (SCB0 to SCB2051) as data S0 to S7 is obtained as a result of each 8-bit shift.

Incidentally, there are 32 2-KB sectors to which a physical sector number is assigned within one cluster. Since the initial value loaded into the shift register 1 is the same cluster number, the scrambling bytes (SCB0 to SCB2051) are the same for the 32 sector units of 2 KB each.

Suppose that main data, that is, scrambled data recorded in each 2-KB sector in a cluster is RD0 to RD2051.

Then supposing that original data before being scrambled is UD0 to UD2051, the data is scrambled as $RD(k)=(UD(k))\$(SCB(k))$ where $ denotes exclusive-or logic, and "k" is a value of 0 to 2051.

A synchronizing signal (frame sync FS) is added to a frame unit of the thus scrambled data RD0 to RD2051, and then the data RD0 to RD2051 is recorded on the disk.

3. Data Format of Rewritable Disk

The ROM disk according to the present embodiment has as one object a data format suitable for compatibility with the rewritable disk. Therefore, prior to description of the ROM disk according to the present embodiment, a data format of the rewritable disk will be described.

Figure 3:
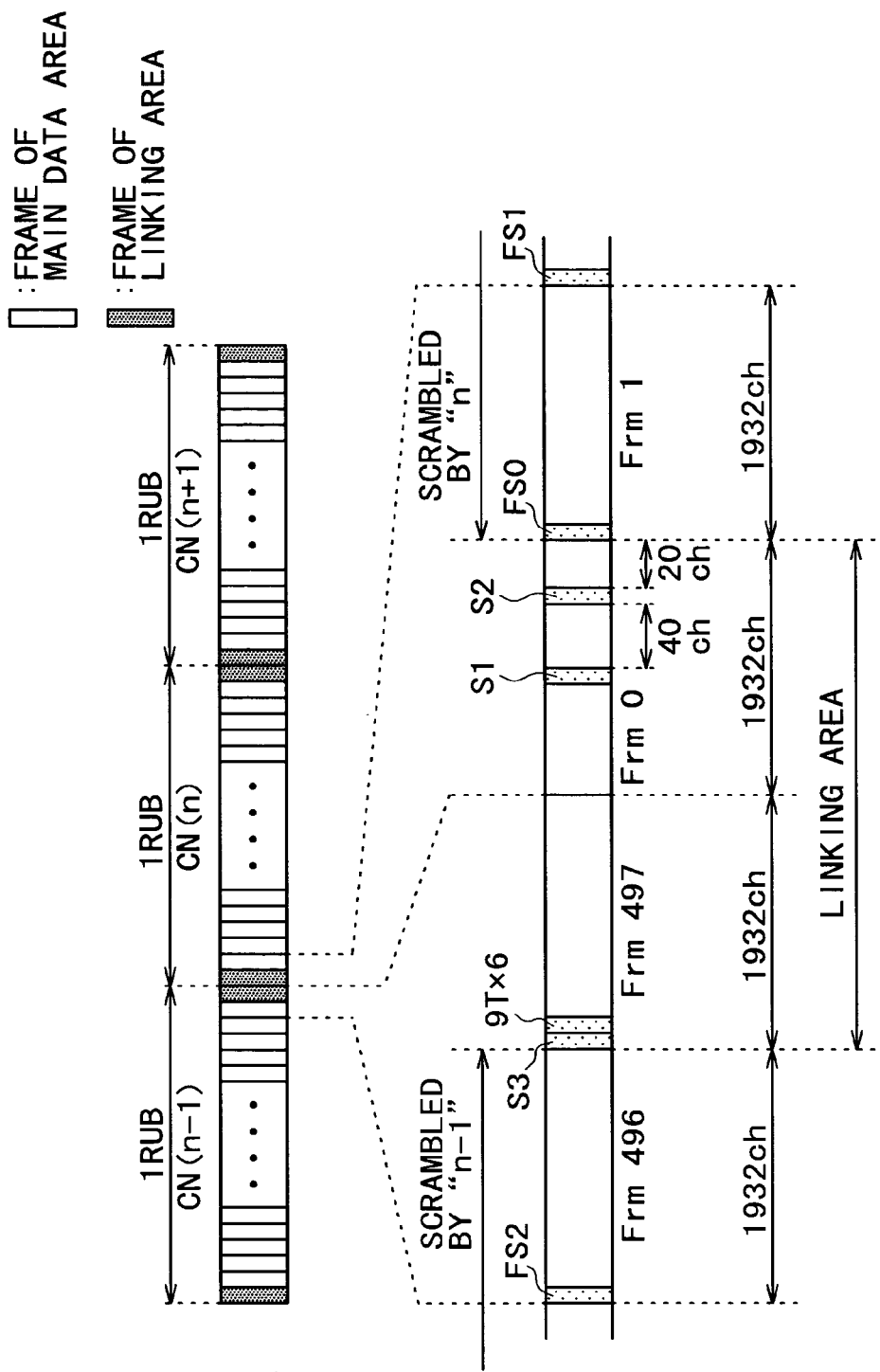
FIGS. 3A and 3B are diagrams of assistance in explaining a data format of the rewritable disk.

FIGS. 3A and 3B show details of a portion including a boundary portion between an RUB and a next RUB, that is, a linking area.

The portion shown in the figures includes RUBs having cluster numbers CN(n−1), CN(n), and CN(n+1), respectively, as PS5 to PS19 of the above-described physical sector number.

As shown in FIG. 1A, one RUB has a start frame Frm0 and an end frame Frm497 as linking area frames. Thus, a linking area of two frames is formed between a main data area of an RUB and a main data area of a next RUB.

The linking area of two frames can be made to have various functions as an RUB buffer.

For example, the linking area is used for PLL clock pull-in in data recording and reproduction. Also, the linking area can be used for automatic adjustment of laser power (APC: Automatic Power Control) in data recording.

The linking area can also serve as a buffer area to deal with recording position variations due to recording start position accuracy.

The linking area can also be a buffer for enabling processing referred to as a start position shift. The start position shift refers to a position shift when a start position of each recording unit block is shifted from a specified start position by random channel bits to avoid excessive wear of the disk.

Further, the linking area can be used as a temporal buffer area for time-requiring processing such as waveform equalizing processing and Viterbi decoding processing at a time of reproduction, for example.

Further, the linking area can be used for laser power APC at a time of ending recording of a block.

As shown in FIG. 3B, a frame Frm0 as a linking frame at a start of an RUB has a sync S2 recorded at a position 20 channel bits before a frame sync FS0 of a data frame Frm1 at a start of a cluster, and has a sync S1 recorded at a position 40 channel bits before the sync S2. The sync S1 and the sync S2 are synchronizing signals for indicating a start (=frame Frm1) of data frames.

In a portion other than the sync S1 and the sync S2 in the linking frame Frm0, a pattern of 3T, 3T, 2T, 2T, 5T, and 5T (T is channel bit length) is recorded repeatedly.

A frame Frm497 as a linking frame at an end of an RUB has a frame sync S3 recorded at a start of the frame, and subsequently has a 9T pattern recorded six times as information for indicating an end of data frames. In the other portion, a pattern of 3T, 3T, 2T, 2T, 5T, and 5T is recorded repeatedly.

Data frames forming a main data area are frames Frm1 to Frm496.

A frame sync FS is recorded at a head of each data frame. Though frame sync patterns will be described later, a frame sync of a sync pattern FS0 is recorded in the data frame Frm1, and a frame sync of a sync pattern FS2 is recorded in the data frame Frm496, as shown in FIG. 3B.

The main data area of the frames Frm1 to Frm496 has 32 2-KB sectors recorded therein, the 32 2-KB sectors being scrambled by the above-described scrambling circuit by scrambling bytes SCB0 to SCB2051 obtained when the cluster number is set as a preset value (shift register initial value).

Each of the frames Frm0 to Frm497 forming the RUB is formed by 1932 channel bits including 30 channel bits of the frame sync FS after modulation.

The scramble as described above is performed to prevent a worst pattern difficult to detect from continuing in modulated patterns on the rewritable disk.

4. First Example of Data Format of ROM Disk

Figure 4:
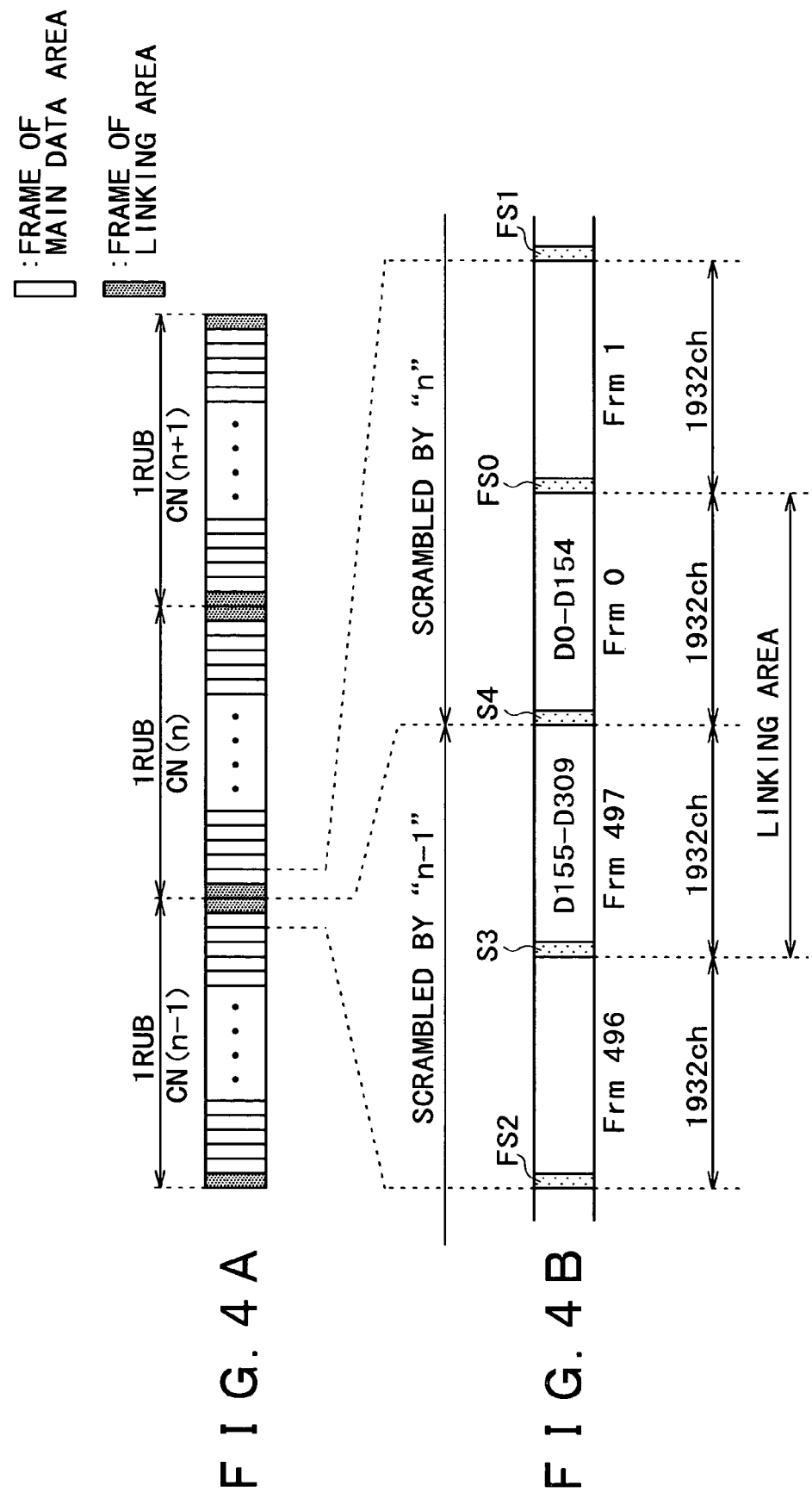
FIGS. 4A and 4B are diagrams of assistance in explaining a first data format example of the ROM disk according to the embodiment.

FIGS. 4A and 4B show a first example of a ROM format. As in FIGS. 3A and 3B, a portion shown in FIGS. 4A and 4B includes RUBs having cluster numbers CN(n−1), CN(n), and CN(n+1) (PS5 to PS19 of physical sector numbers), respectively.

As is also shown in FIG. 1A, in the first format example, one RUB has a start frame Frm0 and an end frame Frm497 as linking frames. Frames Frm1 to Frm496 are data frames forming a main data area.

Thus, the linking area of the two frames is formed between a main data area of an RUB and a main data area of a next RUB.

As shown in FIG. 4B, the frame Frm0 as the linking frame at a start of the RUB has a sync S4 recorded at a head position of the frame. The frame Frm497 as the linking frame at an end of the RUB has a sync S3 recorded at a head position of the frame.

In addition to the sync S4 and the sync S3, linking data D0 to D309 is recorded in the linking frames Frm0 and Frm497. In this case, the linking data D0 to D154 is recorded in the linking frame Frm0, and the linking data D155 to D309 is recorded in the linking frame Frm497. As described in the scrambling system, the linking data D0 to D309 is scrambled by the scrambling circuit in FIG. 2 by scrambling bytes SCB0 to SCB309 obtained when the cluster number is set as a preset value (shift register initial value).

Supposing that original data to be converted into the linking data is all zero data, the scrambling bytes SCB0 to SCB154 are recorded as they are as the data D0 to D154 in the linking frame Frm0, and the scrambling bytes SCB155 to SCB309 are recorded as the data D155 to D309 in the linking frame Frm497.

Incidentally, when the preset value is updated for frame units in the scrambling processing as described above, the linking data D0 to D154 and the linking data D155 to D309 are each scrambled by the scrambling bytes SCB0 to SCB154.

Data frames forming a main data area are frames Frm1 to Frm496.

A frame sync FS is recorded at a head of each data frame. As shown in FIG. 4B, a frame sync of a sync pattern FS0 is recorded in the data frame Frm1, and a frame sync of a sync pattern FS2 is recorded in the data frame Frm496.

The main data area of the frames Frm1 to Frm496 has 32 2-KB sectors recorded therein, the 32 2-KB sectors being scrambled by the scrambling circuit in FIG. 2 by scrambling bytes SCB0 to SCB2051 obtained when the cluster number is set as a preset value (shift register initial value).

Each of the frames Frm0 to Frm497 forming the RUB is formed by 1932 channel bits including 30 channel bits of the frame sync FS after modulation.

Such a ROM format having linking areas is advantageous in terms of compatibility with the rewritable disk. Specifically, the ROM format is advantageous for designing a reproducing apparatus supporting both the rewritable disk and the ROM disk, and is suitable for simplifying the apparatus and reducing cost of the apparatus.

In addition, frames within RUBs including linking areas are scrambled by scrambling bytes generated by a random sequence with each physical sector number (cluster number) as an initial value. Therefore the scrambled frames do not form the same data stream as in an adjacent track, so that a highly accurate DPD signal can be obtained. The ROM format is thus suitable for a tracking servo using the DPD signal.

Further, linking frames and data frames within an RUB are scrambled by scrambling data generated by the same system, that is, scrambling bytes SCB generated using the cluster number as an initial value, as described with reference to FIG. 2. This eliminates the need for providing separate scrambling processing circuits or separate descrambling processing circuits for linking areas and main data areas, and thus makes it possible to simplify circuit configuration.

Further, because of the sync S3 and the sync S4, a sync pattern occurs regularly in each frame section regardless of whether the frame section includes a linking area. The ROM format is therefore advantageous for frame synchronization protection and frame synchronization pull-in.

In the case of the ROM disk, in particular, since there is no wobbling groove on the ROM disk, spindle rotational speed information is obtained on the basis of sync detection. This can be performed properly because a sync pattern occurs regularly in each frame section. That is, the ROM format is advantageous for generating a spindle PLL phase error signal using the sync pattern. Even in a PLL non-synchronization state, in particular, intervals at which the sync pattern occurs can be used as rotational speed information.

5. Second Example of Data Format of ROM Disk

FIGS. 5A and 5B show a second example of a ROM format.

As in FIGS. 4A and 4B, a portion shown in FIGS. 5A and 5B includes RUBs having cluster numbers CN(n−1), CN(n), and CN(n+1) (PS5 to PS19 of physical sector numbers), respectively.

As is also shown in FIG. 1C, in the second format example, first two frames Frm0 and Frm1 of one RUB are linking frames. Frames Frm2 to Frm497 are data frames forming a main data area.

Thus, the linking area of the two frames is formed between a main data area of an RUB and a main data area of a next RUB.

As shown in FIG. 5B, the frame Frm0 as the linking frame at a start of the RUB has a sync S3 recorded at a head position of the frame. The next linking frame Frm1 has a sync S4 recorded at a head position of the frame.

In addition to the sync S3 and the sync S4, linking data D0 to D309 is recorded in the linking frames Frm0 and Frm1.

In this case, the linking data D0 to D154 is recorded in the linking frame Frm0, and the linking data D155 to D309 is recorded in the linking frame Frm1.

As described in the scrambling system, the linking data D0 to D309 is scrambled by the scrambling circuit in FIG. 2 by scrambling bytes SCB0 to SCB309 obtained when the cluster number is set as a preset value (shift register initial value).

Supposing that original data to be converted into the linking data is all zero data, the scrambling bytes SCB0 to SCB154 are recorded as they are as the data D0 to D154 in the linking frame Frm0, and the scrambling bytes SCB155 to SCB309 are recorded as the data D155 to D309 in the linking frame Frm1.

Incidentally, when the preset value is updated for frame units in the scrambling processing as described above, the linking data D0 to D154 and the linking data D155 to D309 are each scrambled by the scrambling bytes SCB0 to SCB154.

Data frames forming a main data area are frames Frm2 to Frm497.

A frame sync FS is recorded at a head of each data frame. As shown in FIG. 5B, a frame sync of a sync pattern FS0 is recorded in the data frame Frm2, and a frame sync of a sync pattern FS2 is recorded in the data frame Frm497.

The main data area of the frames Frm2 to Frm497 has 32 2-KB sectors recorded therein, the 32 2-KB sectors being scrambled by the scrambling circuit in FIG. 2 by scrambling bytes SCB0 to SCB2051 obtained when the cluster number is set as a preset value (shift register initial value).

Each of the frames Frm0 to Frm497 forming the RUB is formed by 1932 channel bits including 30 channel bits of the frame sync FS after modulation.

The second ROM format example can provide the same effects as the first ROM format example described above.

6. Third Example of Data Format of ROM Disk

FIGS. 6A and 6B show a third example of a ROM format.

As in FIGS. 5A and 5B, a portion shown in FIGS. 6A and 6B includes RUBs having cluster numbers CN(n−1), CN(n), and CN(n+1) (PS5 to PS19 of physical sector numbers), respectively.

As is also shown in FIG. 1D, in the third format example, two end frames Frm496 and Frm497 of one RUB are linking frames. Frames Frm0 to Frm495 are data frames forming a main data area.

Thus, the linking area of the two frames is formed between a main data area of an RUB and a main data area of a next RUB.

As shown in FIG. 6B, the second last frame Frm496 as the linking frame in the RUB has a sync S3 recorded at a head position of the frame. The next linking frame Frm497 has a sync S4 recorded at a head position of the frame.

In addition to the sync S3 and the sync S4, linking data D0 to D309 is recorded in the linking frames Frm496 and Frm497.

In this case, the linking data D0 to D154 is recorded in the linking frame Frm496, and the linking data D155 to D309 is recorded in the linking frame Frm497.

As described in the scrambling system, the linking data D0 to D309 is scrambled by the scrambling circuit in FIG. 2 by scrambling bytes SCB0 to SCB309 obtained when the cluster number is set as a preset value (shift register initial value).

Supposing that original data to be converted into the linking data is all zero data, the scrambling bytes SCB0 to SCB154 are recorded as they are as the data D0 to D154 in the linking frame Frm496, and the scrambling bytes SCB155 to SCB309 are recorded as the data D155 to D309 in the linking frame Frm497.

Incidentally, when the preset value is updated for frame units in the scrambling processing as described above, the linking data D0 to D154 and the linking data D155 to D309 are each scrambled by the scrambling bytes SCB0 to SCB154.

Data frames forming a main data area are frames Frm0 to Frm495.

A frame sync FS is recorded at a head of each data frame. As shown in FIG. 6B, a frame sync of a sync pattern FS0 is recorded in the data frame Frm0, and a frame sync of a sync pattern FS2 is recorded in the data frame Frm495.

The main data area of the frames Frm0 to Frm495 has 32 2-KB sectors recorded therein, the 32 2-KB sectors being scrambled by the scrambling circuit in FIG. 2 by scrambling bytes SCB0 to SCB2051 obtained when the cluster number is set as a preset value (shift register initial value).

Each of the frames Frm0 to Frm497 forming the RUB is formed by 1932 channel bits including 30 channel bits of the frame sync FS after modulation.

The third ROM format example can provide the same effects as the first ROM format example described above.

7. ECC Block and Address

As described above, the present example uses an address value of a physical sector number (cluster number) as an initial value for obtaining a scrambling byte. Accordingly, a structure of an ECC block and addresses will be described in the following.

FIGS. 7A, 7B, 7C, and 7D show an ECC format for main data (user data).

As ECC (error correction code), there are two codes, that is, LDC (long distance code) for main data of 64 KB (=2048 bytes per sector×32 sectors) forming one cluster and BIS (burst indicator subcode).

The main data of 64 KB shown in FIG. 7A is ECC-encoded as shown in FIG. 7B. That is, an EDC (error detection code) of 4 B is added to one sector of 2048 B of the main data, and LDC is encoded for the 32 sectors. The LDC is an RS (reed solomon) (248, 216, 33) code with a code length of 248 symbols, data of 216 symbols, and a distance of 33 symbols. There are 304 code words.

On the other hand, BIS is ECC-encoded as shown in FIG. 7D for data of 720 B shown in FIG. 7C. Specifically, the BIS is an RS (reed solomon) (62, 30, 33) code with a code length of 62 symbols, data of 30 symbols, and a distance of 33 symbols. There are 24 code words.

Figure 8:
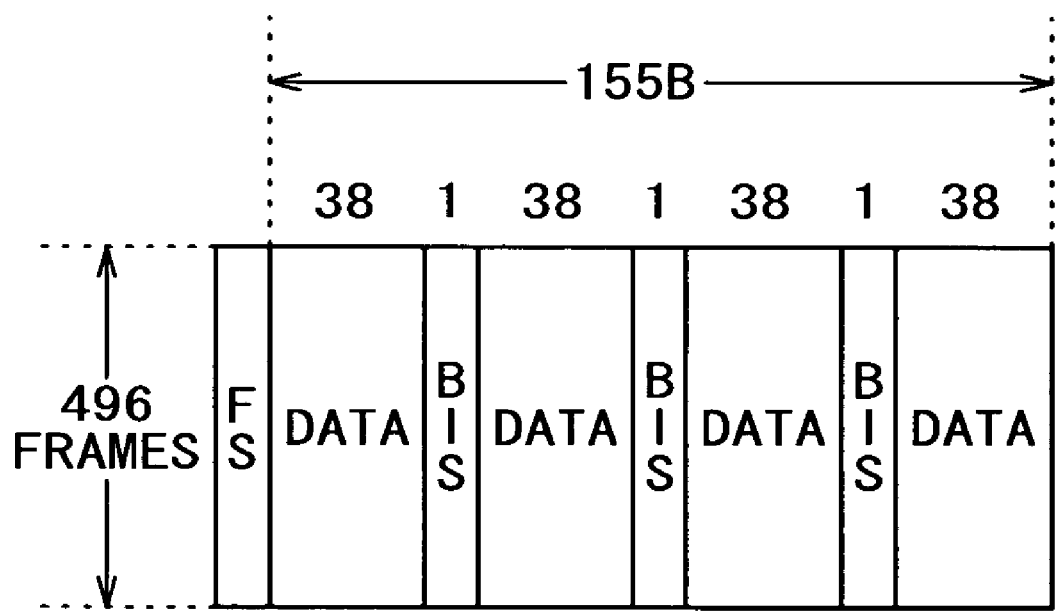
FIG. 8 is a diagram of assistance in explaining a frame structure of the ROM disk according to the embodiment.

FIG. 8 shows a frame structure of the main data.

The LDC data and the BIS form the frame structure shown in the figure. Specifically, data (38 B), BIS (1 B), data (38 B), BIS (1 B), data (38 B), BIS (1 B), and data (38 B) are arranged per frame to form a structure of 155 B. That is, one frame is formed by data of 38 B×4, or 152 B, and BIS of 1 B inserted between each 38 B.

A frame sync FS (frame synchronizing signal) is disposed at the head of one frame of 155 B. One block has 496 frames.

The LDC data has a $0^{th}$, a $2^{nd}$, ... even-numbered code word placed in a $0^{th}$, a $2^{nd}$, ... even-numbered frame and a $1^{st}$, a $3^{rd}$, ... odd-numbered code word placed in a $1^{st}$, a $3^{rd}$, ... odd-numbered frame.

BIS uses a code much superior to the code of LDC in correction capability. Almost all errors are corrected. That is, a code with a distance of 33 symbols for a code length of 62 symbols is used.

Thus, BIS symbols when errors are detected can be used as follows.

In ECC decoding, BIS is decoded first. When two adjacent to each other of BISs and a frame sync FS in the frame structure of FIG. 8 have an error, data of 38 B sandwiched between the two is considered to have a burst error. An error pointer is added to the data of 38 B. In LDC, this error pointer is used to make pointer erasure correction.

Thereby correction capability can be enhanced as compared with correction using only LDC.

BIS includes address information and the like. The address is used when there is no address information in the form of a wobbling groove, as is the case with the ROM disk in this example or the like.

Figure 9:
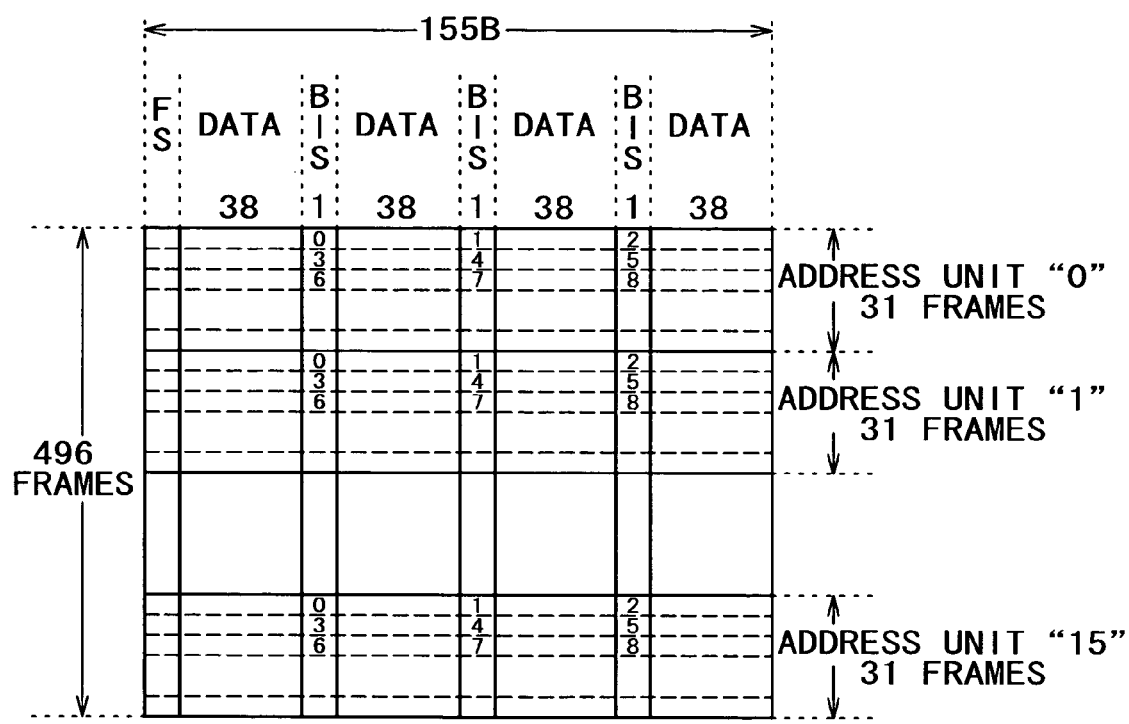
FIG. 9 is a diagram of assistance in explaining address units of the ROM disk according to the embodiment.

In the main data block structure of FIG. 8, address units are formed as shown in FIG. 9.

Specifically, in the main data block, 16 address units "0" to "15" are formed. One address unit comprises 31 frames.

Address fields including a physical sector number as address information and error correcting information are recorded in BISs in each address unit.

The address fields are formed by 9 bytes. As shown in FIG. 9, each frame has a BIS of 1 byte at three positions. BISs in three consecutive frames at a head of each address unit, that is, BISs of 9 bytes are address fields 0 to 8. In FIG. 9, address fields of each address unit are indicated simply by numerals 0 to 8.

A cluster number in a first physical sector number in the main data block of 64 KB, that is, the cluster is used as an initial value in the scrambling circuit of FIG. 2. Thus, in reproduction, descrambling processing is performed using the cluster number in the physical sector number to reproduce the main data.

FIG. 10 shows address units and address fields of physical sector numbers included in BISs as described above.

In the main data block of 64 KB, 16 physical sector numbers are set by the 16 address units "0" to "15."

Each address unit comprises 9 bytes of address fields (AF0, S) to (AF8, S) (where S is 0 to 15).

The 4 bytes of address fields (AF0, S) to (AF3, S) represent a 4-byte physical sector number as described above. (AF0, S) is on an MSB side, and (AF3, S) is on an LSB side.

The address field (AF4, S) is flag bits.

The address fields (AF5, S) to (AF3, S) are RS (9, 5, 5) parity. The address fields (AF0, S) to (AF4, S) are RS (9, 5, 5) data.

8. Sync Patterns and Order

As described in each ROM disk format example, a frame sync FS is recorded at a head of each of 496 data frames. A sync S3 and a sync S4 are recorded in linking frames.

For addressing within the main data block, the 496 frames of the RUB are divided into 16 address units (physical sectors) of 31 frames each, as described above.

By detecting a pattern of a frame sync FS, a frame number (0 to 30) of each of 31 frames within a physical sector can be detected. Thus, addresses of frame units can be detected. That is, an address of a frame unit within data can be obtained as an RUB/sector number and frame number.

As shown in FIG. 11A, seven sync patterns FS0 to FS7 are defined as sync patterns used as frame syncs FS and syncs S3 and S4.

Each of the sync patterns FS0 to FS7 comprises a main body (sync body) of a 24-bit pattern out of rules of RLL (1, 7) PP modulation and a sync ID of 6 bits as identifying information.

The sync patterns are defined by modulation bits. "1" shown in the bit examples of FIG. 11A denotes signal inversion. Before recording onto a disk, such a frame sync code is converted into an NRZI channel bit stream. That is, the sync body is "010100000000010000000010," a pattern in which 9T inverted at "1" is repeated twice continuously, as shown in FIG. 11A.

Zero or one is inserted in # at a head of the sync body so that a pattern preceding # satisfies the rules of RLL (1, 7) PP modulation.

The sync patterns FS0 to FS7, having the same sync body, are distinguished from each other by sync ID.

A physical sector as a unit of 31 frames in a main data block of an RUB has sync patterns FS0 to FS6 mapped as shown in FIG. 11B so that the 31 frames can be identified by frame sync FS.

Since seven kinds of sync patterns are not sufficient to identify the 31 frames, the seven kinds of frame syncs FS (FS0 to FS6) are arranged in predetermined order, so that a frame is identified by a combination of a preceding frame sync and a succeeding frame sync.

As shown in FIG. 11B, a first frame (frame number 0) of each physical sector has a sync pattern FS0. The sync pattern FS0 is unique within the physical sector, thereby making it easy to detect a head of the physical sector, that is, the address unit. That is, the sync pattern FS0 is used to detect the position of a physical sector number.

The other frames (frame numbers 1 to 30) are assigned sync patterns FS1 to FS6 as shown in FIG. 11B.

In this case, a sequence of sync patterns of any five consecutive frame syncs is unique. When two of five consecutive frame syncs are detected, it is possible to detect the position of the frames within the address unit.

Specifically, a frame number n can be identified from a combination of a sync pattern of the frame number n and a sync pattern of one of frame numbers n−1, n−2, n−3, and n−4.

For example, supposing that a frame number of a present frame is 5 (fifth frame), even when frame syncs FS (FS1, FS2, and FS3) of a first, a second, and a third frame preceding the fifth frame are lost, the present frame can be identified as having the frame number 5 from a frame sync FS (FS3) of a fourth frame immediately preceding the fifth frame and a frame sync FS (FS1) of the present frame (fifth frame). This is because the sync pattern FS1 comes next to the sync pattern FS3 only in a specific position in FIG. 11B, that is, the frame numbers 4 and 5.

As shown in the first, second, and third ROM format examples in FIGS. 4A and 4B, FIGS. 5A and 5B, and FIGS. 6A and 6B, syncs S3 and S4 are recorded in linking frames. The sync pattern FS7 is used for the sync S3, and the sync pattern FS2 is used for the sync S4.

Incidentally, for the syncs S1, S2, and S3 shown in FIGS. 3A and 3B in the case of the rewritable disk, the sync patterns FS4, FS6, and FS0 are used, respectively.

In the first, second, and third ROM format examples in FIGS. 4A and 4B, FIGS. 5A and 5B, and FIGS. 6A and 6B, all sequences of five consecutive frame syncs are not unique when the linking area is included. However, by using the sync patterns FS7 and FS2 as the syncs S3 and S4, respectively, a sequence of any four consecutive frame syncs is unique. When two of four consecutive frame syncs are detected, it is possible to detect the position of the frames within the linking area and the address unit.

9. Disk Drive Apparatus

A disk drive apparatus capable of performing recording/reproduction of a disk 1 as a ROM disk or a rewritable disk as described above will next be described.

Figure 12:
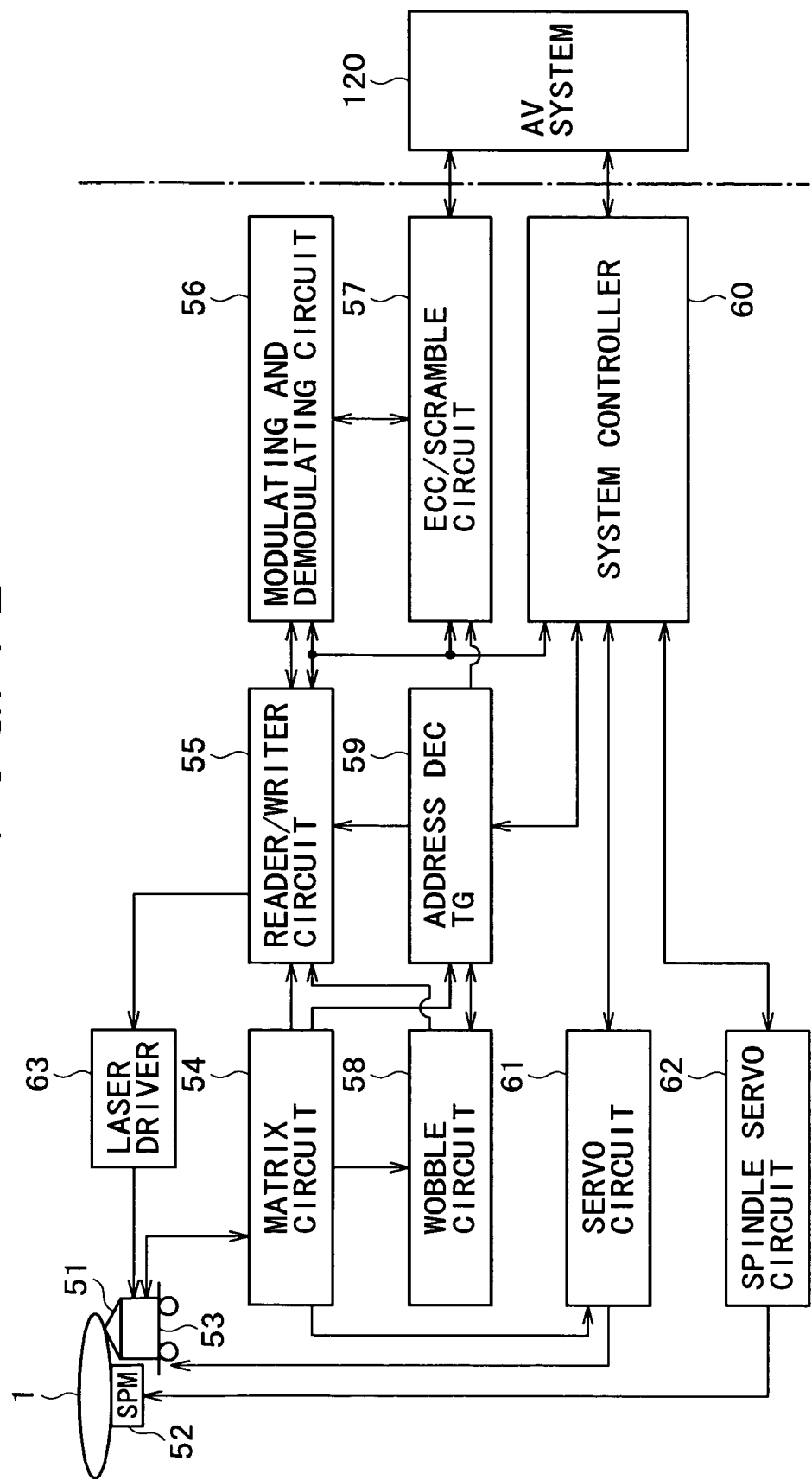
FIG. 12 is a block diagram of a disk drive apparatus according to an embodiment.

FIG. 12 shows a configuration of the disk drive apparatus.

The disk 1 is loaded onto a turntable not shown in the figure, and is driven by a spindle motor 52 to be rotated at a constant linear velocity (CLV) at the time of recording/reproducing operation.

Then an optical pickup (optical head) 51 reads data on the disk 1, that is, data in the form of embossed pits in the case of the ROM disk or data in the form of phase change marks in the case of the rewritable disk. In the case of the rewritable disk, the optical pickup 51 reads ADIP information and disk information embedded as wobbling of a groove track.

At the time of recording on the rewritable disk, the optical pickup records data as phase change marks on the groove track.

Formed within the optical pickup 51 are: a laser diode serving as a laser light source; a photodetector for detecting reflected light; an objective lens at an output end of laser light; and an optical system (not shown) for irradiating a recording surface of the disk with the laser light via the objective lens and guiding the reflected light to the photodetector.

The laser diode outputs a so-called blue laser with a wavelength of 405 nm. An NA of the optical system is 0.85.

The objective lens within the pickup 51 is held by a two-axis mechanism so as to be movable in a tracking direction and a focus direction.

The pickup 51 as a whole is movable in a direction of the radius of the disk by a sled mechanism 53.

The laser diode in the pickup 51 is driven by a drive signal (drive current) from a laser driver 63 to emit laser light.

The photodetector detects information as the light reflected from the disk 1, converts the information into an electric signal corresponding to the amount of light received, and then supplies the electric signal to a matrix circuit 54.

The matrix circuit 54 has a current-voltage conversion circuit, a matrix calculation/amplification circuit and the like for output currents from a plurality of light receiving elements as the photodetector. The matrix circuit 54 generates necessary signals by matrix calculation processing.

For example, the matrix circuit 54 generates a high-frequency signal (reproduced data signal) corresponding to reproduced data, a focus error signal and a tracking error signal for servo control, and the like.

The matrix circuit 54 generates a push-pull signal, for example, as the tracking error signal in the case where the disk 1 is a rewritable disk, whereas the matrix circuit 54 generates a DPD signal, for example, as the tracking error signal in the case where the disk 1 is a ROM disk.

Further, the matrix circuit 54 generates a push-pull signal as a signal related to groove wobbling, that is, a signal for detecting wobbling.

Incidentally, the matrix circuit 54 may be formed within the pickup 51.

The reproduced data signal outputted from the matrix circuit 54 is supplied to a reader/writer circuit 55; the focus error signal and the tracking error signal are supplied to a servo circuit 61; and the push-pull signal as wobbling groove detecting information is supplied to a wobble circuit 58.

The reader/writer circuit 55 subjects the reproduced data signal to binarization processing, reproduced clock generation processing by a PLL and the like, thereby reproduces data read from phase change marks or embossed pits, and then supplies the data to a modulating and demodulating circuit 56.

The modulating and demodulating circuit 56 has a functional part as a decoder at the time of reproduction and a functional part as an encoder at the time of recording.

As decode processing at the time of reproduction, the modulating and demodulating circuit 56 demodulates a run length limited code on the basis of a reproduced clock.

An ECC/scramble circuit 57 performs ECC encode processing that adds error correction codes and the scramble processing as described with reference to FIG. 2 at the time of recording.

The ECC/scramble circuit 57 performs descrambling processing for the scrambling processing as described with reference to FIG. 2, and performs ECC decode processing for error correction at the time of reproduction.

At the time of reproduction, the ECC/scramble circuit 57 captures the data demodulated by the modulating and demodulating circuit 56 into an internal memory, then performs the descrambling processing and error detection/correction processing, and thereby obtains reproduced data.

In the descrambling processing, as described with reference to FIG. 2, the ECC/scramble circuit 57 generates scrambling bytes for data of linking frames and data frames of each RUB on the basis of a cluster number of a physical sector address obtained by an address decoder 59. Using the scrambling bytes, the ECC/scramble circuit 57 performs the descrambling processing for the above-described scramble processing.

The ECC encode processing and the ECC decode processing of the ECC/scramble circuit 57 correspond to the ECC format using the RS (reed solomon) (248, 216, 33) code with a code length of 248 symbols, data of 216 symbols, and a distance of 33 symbols.

The data decoded to the reproduced data by the ECC/scramble circuit 57 is read and transferred to an AV (Audio-Visual) system 120 on the basis of an instruction from a system controller 60.

In the case where the disk 1 is the rewritable disk, the push-pull signal outputted from the matrix circuit 54 as the signal related to groove wobbling is processed in the wobble circuit 58. The push-pull signal as ADIP information is subjected to MSK demodulation and HMW demodulation in the wobble circuit 58, thereby demodulated into a data stream constituting an ADIP address, and then supplied to the address decoder 59.

The address decoder 59 decodes the data supplied thereto, thereby obtains an address value, and then supplies the address value to the system controller 60.

Also, the address decoder 59 generates a clock by PLL processing using a wobble signal supplied from the wobble circuit 58, and supplies the clock to various parts as an encode clock at the time of recording, for example.

In the case where the disk 1 is the ROM disk, the address decoder 59 performs frame sync synchronization processing on the basis of the reproduced data signal, and reads address information, that is, a physical sector number by obtaining information of address fields included in the BISs described above. The address information obtained is supplied to the system controller 60. In this case, the clock reproduced by the PLL in the reader/writer circuit 55 is used as a clock for address detection.

At the time of recording on the rewritable disk, recording data is transferred from the AV system 120. The recording data is supplied to the memory in the ECC/scramble circuit 57 to be buffered.

In this case, as processing for encoding the buffered recording data, the ECC/scramble circuit 57 performs addition of error correction codes, scramble processing, and addition of subcodes and the like.

The ECC-encoded and scrambled data is subjected to RLL (1-7) PP modulation in the modulating and demodulating circuit 56, and then supplied to the reader/writer circuit 55.

As described above, the clock generated from the wobble signal is used as the encode clock serving as a reference clock for the above encode processing at the time of recording.

The recording data generated by the encode processing is supplied as a laser drive pulse to the laser driver 63 after as recording compensation processing, the reader/writer circuit 55 adjusts the waveform of the laser drive pulse and finely adjusts optimum recording power, for example, to characteristics of a recording layer, spot shape of the laser light, recording linear velocity and the like.

The laser driver 63 provides the laser drive pulse supplied thereto to the laser diode within the pickup 51 and thereby drives the laser diode to emit laser light. Thereby pits (phase change marks) corresponding to the recording data are formed on the disk 1.

The laser driver 63 has a so-called APC (Automatic Power Control) circuit to control laser output at a constant level without depending on the temperature and the like while monitoring laser output power through output of a laser power monitoring detector provided within the pickup 51. Target values of the laser output at the time of recording and at the time of reproduction are supplied from the system controller 60, and the laser output level is controlled to be at the target values at the time of recording and at the time of reproduction, respectively.

The servo circuit 61 generates various servo drive signals for focus, tracking, and the sled from the focus error signal and the tracking error signal supplied from the matrix circuit 54, to thereby perform servo operation.

Specifically, the servo circuit 61 generates a focus drive signal and a tracking drive signal according to the focus error signal and the tracking error signal, to drive a focus coil and a tracking coil of the two-axis mechanism within the pickup 51. Thereby a tracking servo loop and a focus servo loop are formed by the pickup 51, the matrix circuit 54, the servo circuit 61, and the two-axis mechanism.

In response to a track jump instruction from the system controller 60, the servo circuit 61 turns off the tracking servo loop and outputs a jump drive signal to thereby perform track jump operation.

The servo circuit 61 further generates a sled drive signal on the basis of a sled error signal obtained as a low-frequency component of the tracking error signal, accessing control from the system controller 60 and the like, to drive the sled mechanism 53. Though not shown, the sled mechanism 53 has a mechanism formed by a main shaft for holding the pickup 51, a sled motor, transmission gear and the like. By driving the sled motor according to the sled drive signal, a required sliding movement of the pickup 51 is effected.

A spindle servo circuit 62 effects control for CLV rotation of a spindle motor 52.

The spindle servo circuit 62 obtains the clock generated by PLL processing on the wobble signal as information on current rotational speed of the spindle motor 52, and compares the information with predetermined CLV reference speed information to thereby generate a spindle error signal.

At the time of data reproduction, the reproduced clock (clock as a reference for decode processing) generated by the PLL within the reader/writer circuit 55 serves as the information on the current rotational speed of the spindle motor 52. Hence, the spindle servo circuit 62 can also generate the spindle error signal by comparing this information with the predetermined CLV reference speed information.

The spindle servo circuit 62 then outputs a spindle drive signal generated according to the spindle error signal to thereby perform the CLV rotation of the spindle motor 52.

Further, the spindle servo circuit 62 generates a spindle drive signal in response to a spindle kick/brake control signal from the system controller 60 to thereby perform operations such as starting, stopping, accelerating, and decelerating the spindle motor 52.

The various operations of the servo system and the recording and reproducing system as described above are controlled by the system controller 60 formed by a microcomputer.

The system controller 60 performs various processing in response to commands from the AV system 120.

For example, when a write command is issued from the AV system 120, the system controller 60 first moves the pickup 51 to an address where writing is to be performed. Then the system controller 60 makes the ECC/scramble circuit 57 and the modulating and demodulating circuit 56 subject data (such as audio data and video data of various systems such for example as MPEG2) transferred from the AV system 120 to the encode processing as described above. The laser drive pulse is then supplied from the reader/writer circuit 55 to the laser driver 63 as described above, whereby recording is performed.

When a read command requesting transfer of some data (MPEG2 video data or the like) recorded on the disk 1 is supplied from the AV system 120, for example, the system controller 60 first effects seek operation control aiming at an address specified. Specifically, the system controller 60 issues a command to the servo circuit 61 to effect access operation of the pickup 51 targeting the address specified by a seek command.

Then, the system controller 10 effects operation control necessary to transfer data of the specified data section to the AV system 120. Specifically, the system controller 60 effects reading of the data from the disk 1, effects decoding/buffering and the like in the reader/writer circuit 55, the modulating and demodulating circuit 56, and the ECC/scramble circuit 57, and then transfers the requested data.

At the times of recording and reproduction of data, the system controller 60 controls access and recording and reproducing operation using ADIP addresses or addresses included in BISs detected by the address decoder 59.

While the disk drive apparatus in the example of FIG. 12 is connected to the AV system 120, the disk drive apparatus according to the present invention may be connected to for example a personal computer or the like.

Further, there can be an embodiment in which the disk drive apparatus is not connected to another apparatus. In such a case, an operation unit and a display unit are provided, and the configuration of an interface part for data input and output is different from that of FIG. 12. That is, it suffices to perform recording and reproduction in response to an operation by a user and form a terminal part for inputting and outputting various data.

Of course, various other configuration examples are conceivable; for example, an example as a reproduction-only apparatus is conceivable.

10. Disk Manufacturing Method

A method of manufacturing the ROM disk according to the present embodiment described above will next be described.

A disk manufacturing process is roughly divided into a so-called mastering process and a replication process. The mastering process covers steps up to completion of a metallic master (stamper) used in the replication process. The replication process mass-produces duplicate optical disks using the stamper.

Specifically, the mastering process performs so-called mastering in which a photoresist is coated on a polished glass substrate, and pits and grooves are formed by exposing the photosensitive film to light of a laser beam.

In the case of the present embodiment, a pit train having an RUB structure as in the foregoing first, second, and third ROM format examples is formed on the ROM disk. Therefore mastering is performed to form the pit train in the mastering process.

In mastering, main data and linking data are subjected to necessary encode processing (such as ECC encode and RLL (1, 7) PP encode) and scramble processing as described with reference to FIG. 2. On the basis of the thus formed data train, parts exposed to light as the pit train are formed on the glass substrate.

Incidentally, the main data to be recorded is prepared in a preparatory process referred to as premastering.

After the mastering is completed, predetermined processing such as development and the like is performed, and then information is transferred onto a metallic surface by electroforming, for example, to create a stamper required when replicating the disk.

Then, the information is transferred onto a resin substrate by an injection method, for example, using the stamper, a reflective film is formed thereon, and thereafter processing of machining into a required disk shape and the like is performed, whereby a final product is completed.

Figure 13:
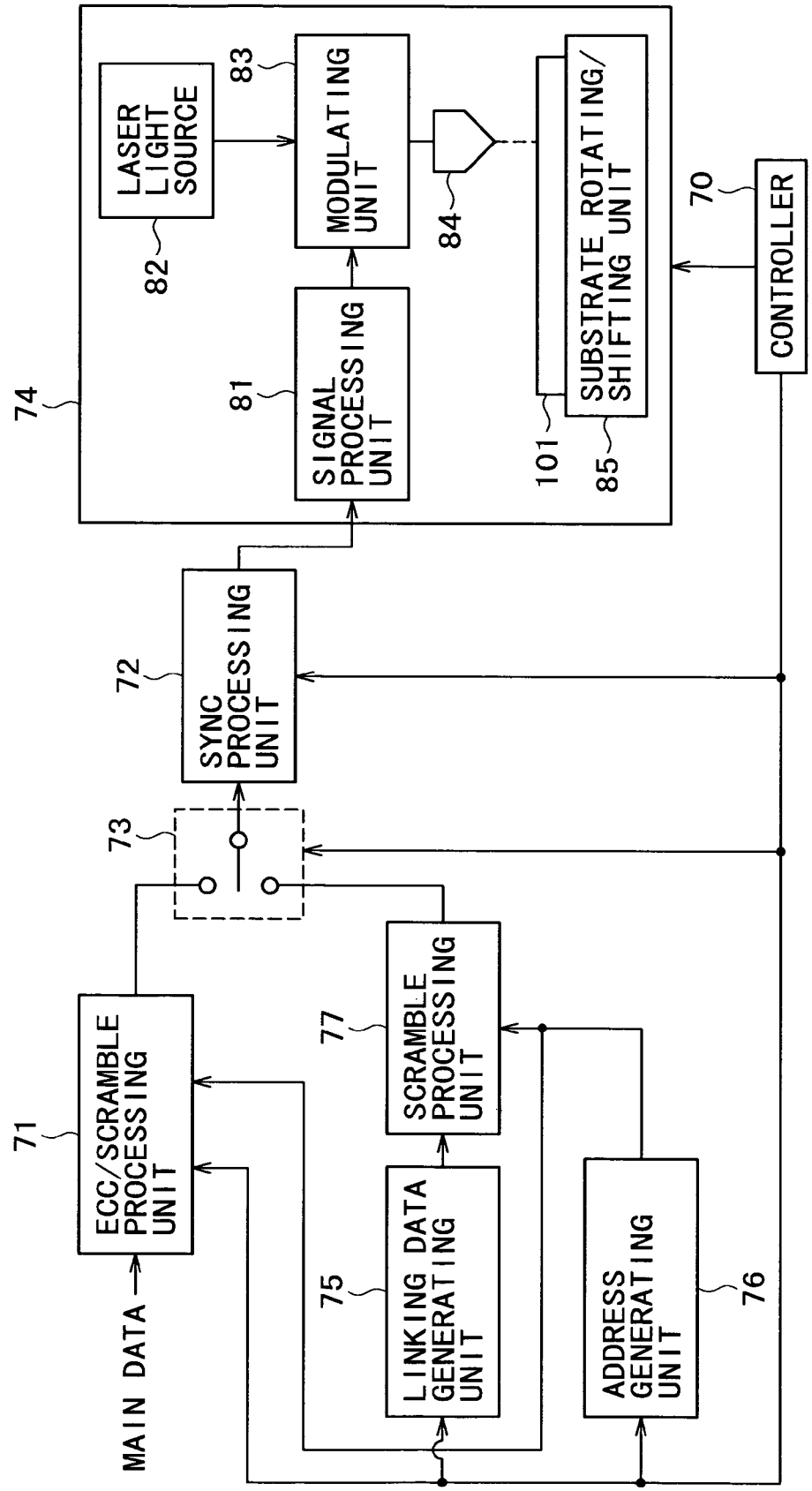
FIG. 13 is a block diagram of a mastering apparatus according to an embodiment.

Mastering is performed in such a manufacturing process. As shown in FIG. 13, for example, a mastering apparatus comprises a controller 70, an ECC/scramble processing unit 71, a sync processing unit 72, a switch unit 73, a mastering unit 74, a linking data generating unit 75, an address generating unit 76, and a scramble processing unit 77.

The ECC/scramble processing unit 71 subjects the main data prepared in the premastering process to ECC error correction encode processing and scramble processing as described with reference to FIG. 2.

The linking data generating unit 75 generates original data LD0 to LD309 of data D0 to D309 to be recorded in linking frames. The data LD0 to LD309 is subjected to the scramble processing as described with reference to FIG. 2 by the scramble processing unit 77 to become the data D0 to D309.

The address generating unit generates address information as physical sector numbers. This address information is supplied to the ECC/scramble processing unit 71 and the scramble processing unit 77.

In encode processing, the ECC/scramble processing unit 71 sets a physical sector number supplied thereto as information of address fields included in BISs. Further, in scramble processing, the ECC/scramble processing unit 71 uses a cluster number of a physical sector number as a scramble initial value.

The scramble processing unit 77 also uses a cluster number of a physical sector number supplied from the address generating unit 76 as a scramble initial value.

The switch unit 73 selects output of the ECC/scramble processing unit 71 during a period when frame data corresponding to a main data area is outputted from the ECC/scramble processing unit 71, and selects output of the scramble processing unit 77 during a period when frame data corresponding to a linking area is outputted from the scramble processing unit 77. Consequently, a data stream of the above-described RUB structure is supplied to the sync processing unit 72.

The sync processing unit 72 adds a frame sync FS of a predetermined sync pattern as described above, or a sync S3 or S4 to each frame.

Data output timing of the ECC/scramble processing unit 71, the linking data generating unit 75, and the address generating unit 76 and switching timing of the switch unit 73 are controlled by the controller 70.

The mastering unit 74 includes: an optical unit (82, 83, and 84) for irradiating a photoresist-coated glass substrate 101 with a laser beam to thereby perform mastering; a substrate rotating/shifting unit 85 for rotation driving and slide shifting of the glass substrate 101; and a signal processing unit 81 for converting input data to recording data and supplying the recording data to the optical unit.

The optical unit includes: a laser light source 82 formed by an He—Cd laser, for example; a modulating unit 83 for modulating light emitted from the laser light source 82 on the basis of the recording data; and a mastering head unit 84 for condensing the modulated beam from the modulating unit 83 and irradiating a photoresist surface of the glass substrate 101 with the modulated beam.

The modulating unit 83 includes: an acoustooptic type optical modulator (AOM) for turning on/off the light emitted from the laser light source 82; and an acoustooptic type optical deflector (AOD) for deflecting the light emitted from the laser light source 82 on the basis of a wobble generating signal.

The substrate rotating/shifting unit 85 comprises: a rotating motor for rotation-driving the glass substrate 101; a detecting unit (FG) for detecting rotational speed of the rotating motor; a slide motor for sliding the glass substrate 101 in a direction of the radius of the glass substrate 101; and a servo controller for controlling the rotational speed of the slide motor and the rotating motor, tracking of the mastering head unit 84 and the like.

The signal processing unit 81 subjects data supplied from the sync processing unit 72 to for example RLL (1, 7) PP modulation processing and further modulation processing for obtaining a drive signal to be supplied to the modulating unit 83 for mastering.

At the time of mastering, the substrate rotating/shifting unit 85 in the mastering unit 74 rotation-drives the glass substrate 101 at a constant linear velocity and slides the glass substrate 101 while rotating the glass substrate 101 so that a spiral track is formed at a predetermined track pitch.

At the same time, the light emitted from the laser light source 82 is converted via the modulating unit 83 into a modulated beam on the basis of the modulating signal from the signal processing unit 81, and then applied from the mastering head unit 84 to the photoresist surface of the glass substrate 101. As a result, the photoresist is exposed to light on the basis of the data and groove.

The controller 70 also controls performance of operation at the time of such mastering by the mastering unit 74.

As a result of such operation, light-exposed parts corresponding to the pit train of an RUB structure as in the above-described ROM format examples are formed on the glass substrate 101.

Thereafter, development, electroforming and the like are performed to create a stamper, and the ROM disk is produced using the stamper.

As described above, the produced ROM disk has linking areas, and data of all frames in main data areas and the linking areas is scrambled by scrambling bytes SCB obtained by using a cluster number as an initial value.

While the disk according to the present embodiment, the disk drive apparatus compatible with the disk, and the disk manufacturing method have been described above, the present invention is not limited to these examples; various modifications are conceivable without departing from the spirit of the present invention.

As is understood from the above description, the present invention has the following effects.

The reproduction-only recording medium (ROM disk) according to the present invention has blocks formed by main data areas and linking areas, that is, has a data format provided with linking areas as with the rewritable disk. The reproduction-only recording medium according to the present invention is thus suitable for compatibility with the rewritable disk.

Main data recorded in a main data area and linking data recorded in a linking area in each block are scrambled by scrambling data generated by the same system.

The linking data being scrambled means that even when linking areas are aligned with each other in tracks adjacent to each other, the pit patterns are not the same. This solves the problem disadvantageous to the tracking servo system using a DPD signal as an error signal, that is, the problem of being unable to obtain a satisfactory DPD signal because of the same pit patterns. In other words, it is possible to effect stable tracking control on the reproduction-only recording medium with embossed pits by the tracking servo system using the DPD signal, and in turn improve reproduction performance of the reproducing apparatus.

In addition, the scramble processing prevents a worst pattern from a viewpoint of detection from continuing in main data, thus facilitating data detection.

Further, for main data areas and linking areas, the scramble processing and descramble processing can be performed by the same scrambling system. That is, the reproducing apparatus can use a common hardware configuration for performing scramble-related processing on main data and linking data. This simplifies circuit configuration of the apparatus.

The descrambling processing on the linking data is indispensable at the time of reproduction especially when some data is recorded as the linking data. In this case, it is not necessary to have a plurality of descrambling processing circuit systems.

Further, the scrambling data is generated by a random sequence using address information of a block as an initial value. This means that the initial value differs for different blocks. That is, the pit pattern is scrambled and formed in a different state in each block. Therefore cases in which the pit pattern is the same between adjacent linking areas, including for example cases where the linking data is all zero data or identical pattern data, do not occur. Thus a desirable state for servo control using the DPD signal can be realized.

Further, the disk manufacturing method according to the present invention makes it possible to manufacture a reproduction-only recording medium providing these effects.

What is claimed is:

1. A reproduction-only recording medium wherein blocks having a main data area and a linking area are continuous with each other to form a data track by embossed pits, the data track being divided into 32-bit physical sector numbers; and main data recorded in said main data area and linking data recorded in said linking area in each of said blocks are scrambled by a random sequence scrambling data of 8-bit scrambling bytes generated by an identical system including a 16-bit shift register being loaded with an initial value and generating the 8-bit scrambling bytes by taking an initial eight bits in the shift register as a first scrambling byte and performing an eight bit shift to generate subsequent scrambling bytes from the initial eight bits of the shift register, wherein a 15-bit cluster number in at least one of the 32-bit physical sector numbers in the data track and a bit of value 1 is preset as the initial value when said main data and linking data are scrambled by the random sequence.

2. A reproduction-only recording medium as claimed in claim 1, wherein in each of said blocks, said linking area is formed on a front end side and a rear end side of said main data area.

3. A reproduction-only recording medium as claimed in claim 1, wherein in each of said blocks, said linking area is formed on only a front end side of said main data area.

4. A reproduction-only recording medium as claimed in claim 1, wherein in each of said blocks, said linking area is formed on only a rear end side of said main data area.

5. A reproducing apparatus for performing data reproduction in correspondence with at least a reproduction-only recording medium in which medium blocks having a main data area and a linking area are continuous with each other to form a data track by embossed pits, the data track being divided into 32-bit physical sector numbers, and main data recorded in said main data area and linking data recorded in said linking area in each of said blocks are scrambled by a random sequence scrambling data of 8-bit scrambling bytes generated by an identical system including a 16-bit shift register being loaded with an initial value and generating the 8-bit scrambling bytes by taking an initial eight bits in the shift register as a first scrambling byte and performing an eight bit shift to generate subsequent scrambling bytes from the initial eight bits of the shift register, said reproducing apparatus comprising:

reading means for reading information from a recording medium loaded into the reproducing apparatus; and decoding means for subjecting the information read by said reading means to data decoding processing and descrambling processing for said scramble, and reproducing said main data and said linking data, wherein said decoding means subjects the information read by said reading means to said descrambling processing using scrambling data, and wherein a 15-bit cluster number in at least one of the 32-bit physical sector numbers in the data track and a bit of value 1 is preset as the initial value when said main data and linking data are scrambled by the random sequence.

6. A reproducing method for reproducing data from a reproduction-only recording medium, in which medium blocks having a main data area and a linking area are continuous with each other to form a data track by embossed pits, the data track being divided into 32-bit physical sector numbers, and main data recorded in said main data area and linking data recorded in said linking area in each of said blocks are scrambled by a random sequence scrambling data of 8-bit scrambling bytes generated by a random sequence using address information of said block as an initial value by a system including a 16-bit shift register being loaded with an initial value and generating the 8-bit scrambling bytes by taking an initial eight bits in the shift register as a first scrambling byte and performing an eight bit shift to generate subsequent scrambling bytes from the initial eight bits of the shift register, said reproducing method comprising:

reading information from a loaded recording medium; and subjecting the read information to data decoding processing and descrambling processing using scrambling data generated by the random sequence, wherein a 15-bit cluster number in at least one of the 32-bit physical sector numbers in the data track and a bit of value 1 is preset as the initial value when said main data and linking data are scrambled by the random sequence.

7. A disk manufacturing method for manufacturing a reproduction-only disk recording medium, in which medium blocks having a main data area and a linking area are continuous with each other as a data track formed by embossed pits, the data track being divided into 32-bit physical sector numbers, said disk manufacturing method comprising:

scrambling main data recorded in said main data area and linking data recorded in said linking area by using scrambling data of 8-bit scrambling bytes generated by the random sequence by a system including a 16-bit shift register being loaded with an initial value and generating the 8-bit scrambling bytes by taking an initial eight bits in the shift register as a first scrambling byte and performing an eight bit shift to generate subsequent scrambling bytes from the initial eight bits of the shift register, wherein a 15-bit cluster number in at least one of the 32-bit physical sector numbers in the data track and a bit of value 1 is preset as an initial value when said main data and linking data are scrambled by the random sequence; and performing disk mastering using the scrambled data.

\* \* \* \* \*